Feb. 13, 1934.                M. L. HASELTON                 1,946,531
                            ELECTRICAL SIGNALING
                      Original Filed Jan. 6, 1928    2 Sheets-Sheet 1
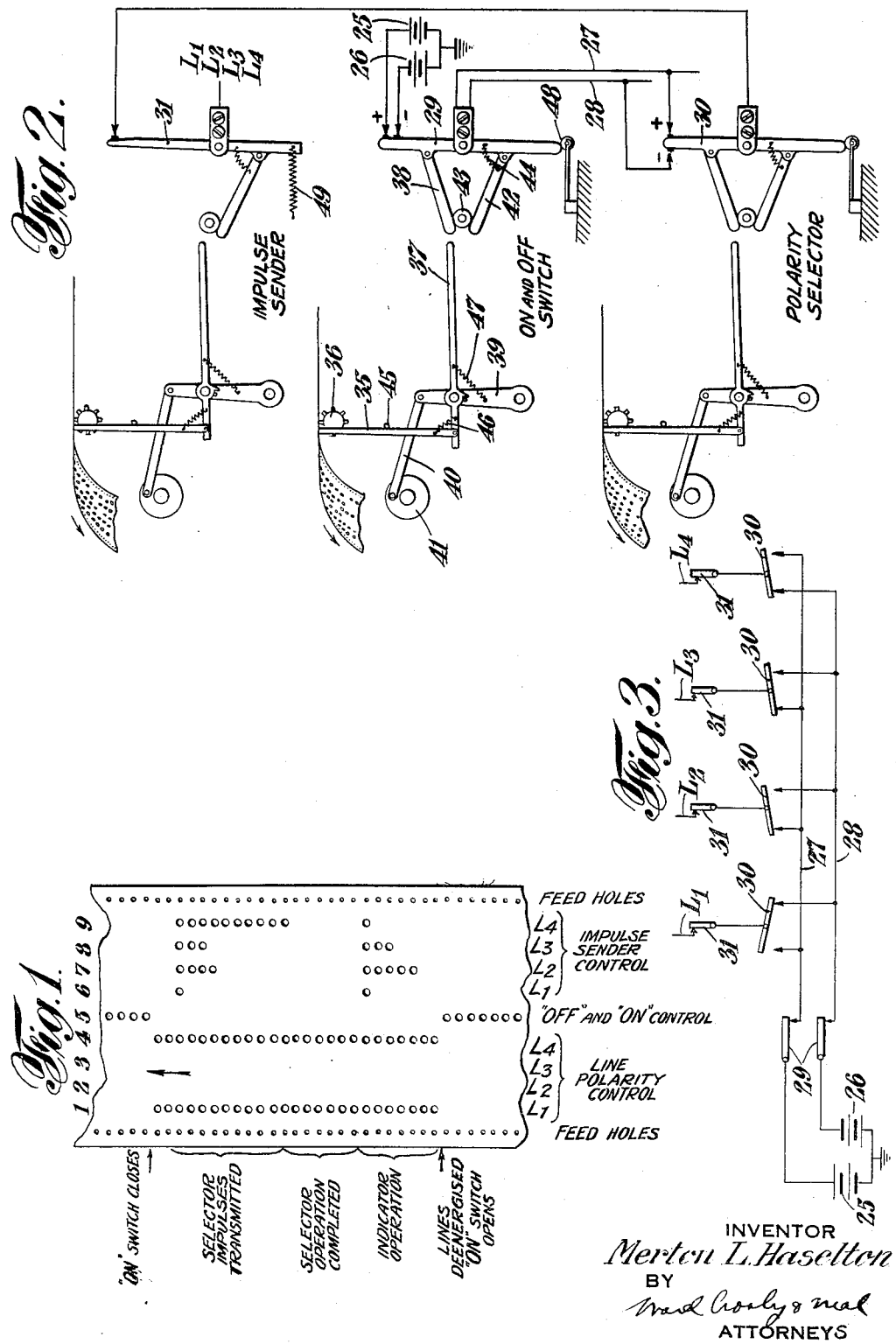
INVENTOR
Merton L. Haselton
BY
Ward Crosby & Neal
ATTORNEYS

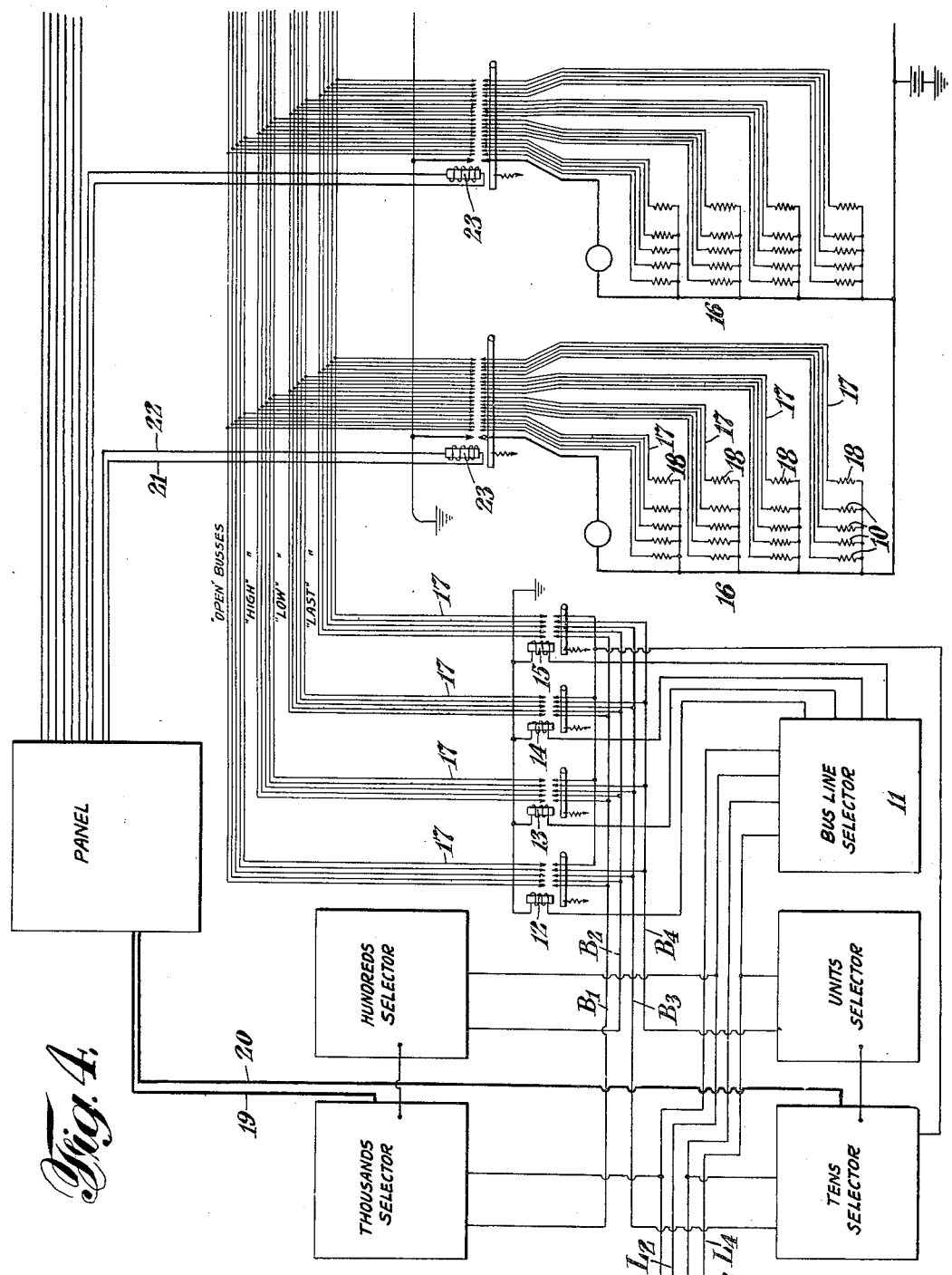

Patented Feb. 13, 1934

1,946,531

UNITED STATES PATENT OFFICE 1,946,531

ELECTRICAL SIGNALING

Merton L. Haselton, New York, N. Y., assignor to The Teleregister Corporation, New York, N. Y., a corporation of Delaware Original application January 6, 1928, Serial No. 244,873, now Patent No. 1,890,876. Divided and this application January 6, 1930. Serial No. 418,802

2 Claims. (Cl. 177—380)

This invention relates to electrical signaling and particularly to electrical transmitting mechanism, one embodiment of which is shown in my copending application Serial No. 244,873, filed January 6, 1928, of which this application is a division, and which is now Patent No. 1,890,876.

Among the objects of this invention is the provision of improved transmitting means and methods applicable generally to systems in which a large number of quotations or items are to be separately posted or registered and in which several points of information or characteristics relative to each quotation or item may, if desired, be posted or registered.

A specific object is the provision of switch mechanism for imposing various combinations of positive and negative polarities on electrical channels equal in number to the elements in each indicator for preparing circuits to all of the corresponding indicators of the various groups, and for interrupting said potentials to select a group of indicators and to subsequently set up any desired information on the selected indicator.

Other objects will be apparent from the following description taken in connection with the drawings, in which Fig. 1 shows a section of a transmitting tape;

Fig. 2 shows a system of switches controlled by the tape;

Fig. 3 shows a wiring diagram of connection from sources of potential to electrical transmitting channels; and Fig. 4 is a wiring diagram showing the hook-up of the various mechanisms in the receiving station.

The mechanism in the transmitting station, Figs. 1, 2 and 3, comprises tape controlled switches for setting up electrical variations on electrical channels extending to the receiving station or stations to control mechanism shown diagrammatically in Fig. 4.

In the embodiment disclosed, these electrical channels $L_1$, $L_2$, $L_3$, and $L_4$ are equal in number to the number of indicators indicated at 10 in each indicator unit of a stock quotation board. Each group of indicators comprises four indicator units for indicating the "open", "high", "low" and "last" quotations.

As disclosed in the parent application, the lines $L_1$, $L_2$, $L_3$ and $L_4$ energize combinations of magnets in a bus line selector 11 which closes a circuit to one of the bus line selecting magnets 12, 13, 14 and 15 to connect one of the common bus lines for the "open", "high", "low" and "last" indicator units to lines $B_1$, $B_2$, $B_3$ and $B_4$ adapted to be electrically connected to lines $L_1$, $L_2$, $L_3$ and $L_4$ in the thousands, hundreds, tens and units selectors after the selection of a group of indicators 16 has been made by these selectors. Each bus line also includes a restoration line 17 leading to a restoring magnet 18. This line is adapted to be opened in the tens selector after restoration of the selected unit has been effected.

The thousands and hundreds selectors are controlled by impulses over lines $L_1$ and $L_2$ and the tens and units selectors by impulses over lines $L_3$ and $L_4$. The former pair cooperate complementarily to connect one branch 19 of one of numerous selector circuits to battery to ground while the latter pair connect the other branch 20 of one of numerous selector circuits to the ground. As disclosed in the parent application, the various branches 19 and 20 cross in the panel board and at their intersection are connected by a double plug to the terminal wires 21 and 22 of one of the group magnets 23 which connects all of the bus wires and restoring lines to all of the indicator magnets and restoring magnets of this group of indicators.

The operation of the mechanism in the receiving station is generally as follows: Combinations of positive and negative potentials on lines $L_1$, $L_2$, $L_3$ and $L_4$ control the bus line selector to connect one of the bus lines to lines $B_1$, $B_2$, $B_3$ and $B_4$ and the corresponding restoring line to ground. These potentials regardless of their sign have conditioned the thousands, hundreds, tens and units selectors to perform a selecting operation under control of the immediate subsequent series of interruptions of potentials on the lines $L_1$, $L_2$, $L_3$ and $L_4$ to establish a circuit through one of the group magnets 23, and to electrically connect lines $B_1$, $B_2$, $B_3$ and $B_4$ to lines $L_1$, $L_2$, $L_3$ and $L_4$ whereby the next series of interruptions of potentials on lines $L_1$, $L_2$, $L_3$ and $L_4$ will cause corresponding impulses on lines $B_1$, $B_2$, $B_3$ and $B_4$ to operate the selected indicator unit, this indicator unit having been restored to zero previously by a circuit over its restoration line 17 completed by the magnet 23 and broken by the tens selector unit. After the selected indicator has been set, the potentials are removed from lines $L_1$, $L_2$, $L_3$ and $L_4$ and all the parts restored to normal.

The means for imposing combinations of potentials on lines $L_1$, $L_2$, $L_3$ and $L_4$ and interrupting the same, comprises as shown schematically in Fig. 3, sources of positive and negative potentials 25 and 26 adapted to be connected to lines 27 and 28 by a double contact switch 29. Either of the lines 27 and 28 may be connected by four two-way switches 30 to lines $L_1$, $L_2$, $L_3$ and $L_4$ over interruption switches 31.

The switches may be controlled by a tape such as shown in Fig. 1, which is provided with nine parallel fields that may receive perforations. Field 5 controls the on and off switch 29, fields 1, 2, 3 and 4 control four polarity selector switches 30 and fields 6, 7, 8 and 9 control four impulse sender or interruption switches 31. For purposes of disclosure only one of each of the switches 30 and 31 is shown in Fig. 2.

The on and off switch 29 is controlled by a sensing pin or feeler 35 cooperating with field 5 on the tape. The tape is fed past the pin by suitable sprocket mechanism 36 and the vertical position of the pin is controlled by the blank spaces and perforations in this field. In the position shown, the pin engages a blank space and holds the free end of a switch operating lever 37 on which it is supported in driving alinement with an arm 38 on the pivoted switch 29. The operating lever 37 is pivotally supported on a pivoted arm 39 operated by a link 40 driven by a disk 41, by which it is moved to the right in timed relation to the sprocket feed mechanism whenever a blank space or perforation is presented to the pin. When the pin is in the position shown, the operating lever 37 will throw the switch 29 clockwise to the closed position. A perforation in the strip permits the pin to rise and rock the operating lever to engage with another arm 42 on the switch 29 to rock it counterclockwise to open position. The upper arm 38 rests under gravity on a guiding roller 43 while the lower arm 42 is spring drawn against this roller by a spring 44. The sensing pin 35 is preferably guided in its movements by a fixed pin 45 against which it is drawn by a spring 46 which permits it to yield in the direction of movement of the tape. The sensing pin is raised into perforations by a spring 47 connected to the operating lever 37 and arm 39, this movement of the pin being limited by engagement of a shoulder on the lever with a pin in the arm as shown.

In order that the switch 29 may be continuously held in the off position for a series of successive perforations in field 5, as when no information is to be transmitted, and to be held in the on position for a series of successive blank spaces, as when selection and actuation of an indicator is being effected, a spring pressed roller 48 is provided to cooperate with the lower end of the switch lever 29 to hold it in either of its positions. The roller functions to hold the switch lever 29 in either of its positions until it is shifted into its other position under control of the tape.

The polarity switches 30 which cooperate with fields 1, 2, 3 and 4 are of the same construction as the on and off switch, being different only in the contacts which extend either the positive or negative potential lines 27 or 28 over the impulse sender switches 31 to the lines $L_1$, $L_2$, $L_3$, $L_4$. The roller 48 is necessary to maintain the polarities on the lines $L_1$, $L_2$, $L_3$, $L_4$ during the entire indicator selection and operation period as the combinations of polarities on these lines connect the desired bus lines to the lines $B_1$, $B_2$, $B_3$, $B_4$.

The switches 31 interrupt the potentials in the lines $L_1$, $L_2$, $L_3$, $L_4$ for selecting a group of indicators and for sending impulses over lines $B_1$, $B_2$, $B_3$, $B_4$ to operate the selected indicator. The switches 31 may therefore remain open only momentarily. For this purpose, they are drawn to closed position by a spring 49 as the operating lever 37 is moved to the left. The upper arm 38 used on the other switches is therefore omitted from the construction of switches 31.

The section of tape shown in Fig. 1 by way of illustration, controls the sensing pins and other mechanism in the following manner. The tape is fed towards the top of the sheet. The perforations in field 5 control the on and off switch in the off position. The first blank space in this field causes the switch to be thrown on and the lines 27 and 28 to be connected to the potentials 25 and 26. Simultaneously the polarity switches 30 cooperating with fields 1 and 4 connect lines $L_1$ and $L_4$ with the negative potential line 28 and switches 30 cooperating with fields 2 and 3 maintain the connection between lines $L_2$ and $L_3$ and the positive potential line 27. This combination of polarities connects the "last" bus lines to the lines $B_1$, $B_2$, $B_3$, $B_4$, as described in the parent application.

The selector impulse sender perforations interrupt these potentials and control the thousands, hundreds, tens and units selector to cause the energization of group magnet 23 corresponding to group indicator 1430 to connect all of the bus and restoring lines to the indicator units of this group. The selected indicator is restored to zero and the restoring circuit is opened under control of the tens selector. The indicator operation perforations operate the switches 31 to send impulses over lines $L_1$, $L_2$, $L_3$, $L_4$ and resultant impulses over $B_1$, $B_2$, $B_3$, $B_4$ to the selected indicator to set up 1531. The next series of perforations in field 5 open the on and off switch 29 and de-energize and restore the entire system of selectors and magnets.

While the description relates to the single embodiment of the invention illustrated for purposes of disclosure, it is to be understood that this invention is not limited thereto and that other forms or embodiments thereof may occur to those skilled in this art.

I claim:

1. The combination with sources of positive and negative polarities, of a transmission line, an impulse sending switch normally closing a circuit over said line, a polarity selector switch normally in position to close a circuit of one polarity to said impulse sending switch and adapted to be moved to close a circuit of another polarity to said impulse sending switch, means for holding said polarity selector switch in either of its moved positions, an on and off switch for connecting both sources of polarities to the contacts of said polarity selector switch, means for holding said on and off switch in either its open or closed position, and means for closing said on and off switch and simultaneously operating said polarity selector switch when necessary and then opening and closing said impulse sending switch the desired number of times in rapid succession and thereafter opening said on and off switch and simultaneously restoring said polarity selector switch when necessary.

2. The combination with sources of positive and negative polarities, of a transmission line, an impulse sending switch for opening and closing a circuit over said line, a polarity selector switch for closing circuits of either polarity to said impulse sending switch, means for holding said polarity selector switch in either of its circuit closing positions, an on and off switch for connecting both sources of polarities to the contacts of said polarity selector switch, means for holding said on and off switch in either its open or closed position, and means for closing said on and off switch and controlling said polarity selector switch, then operating said impulse sending switch the desired number of times and thereafter opening said on and off switch.

MERTON L. HASELTON.